(12) United States Patent  (10) Patent No.: US 9,038,006 B2
Moheban et al.  (45) Date of Patent: May 19, 2015

(54) METHOD AND APPARATUS FOR GENERATING GATE-LEVEL ACTIVITY DATA FOR USE IN CLOCK GATING EFFICIENCY ANALYSIS

(71) Applicant: FREESCALE SEMICONDUCTOR, INC., Austin, TX (US)

(72) Inventors: Lior Moheban, Nes Ziona (IL); Asher Berkovitz, Kiryat Ono (IL); Guy Shmueli, Shoam (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/874,477

(22) Filed: Apr. 30, 2013

(65) Prior Publication Data

US 2014/0325461 A1  Oct. 30, 2014

(51) Int. Cl.
 *G06F 17/50* (2006.01)
(52) U.S. Cl.
 CPC ..................... *G06F 17/505* (2013.01)
(58) Field of Classification Search
 CPC ............ G06F 17/5045; G06F 17/5022; G06F 2217/75; G06F 17/505; G06F 2217/78
 USPC .................. 716/104, 106, 108, 109, 113, 136
 See application file for complete search history.

(56) References Cited

U.S. PATENT DOCUMENTS

| | | | |
|---|---|---|---|
| 6,212,667 B1 * | 4/2001 | Geer et al. ..................... | 716/136 |
| 6,247,165 B1 * | 6/2001 | Wohl et al. .................... | 716/103 |
| 6,324,679 B1 * | 11/2001 | Raghunathan ................ | 716/133 |
| 6,434,704 B1 | 8/2002 | Dean et al. | |
| 6,536,024 B1 * | 3/2003 | Hathaway ..................... | 327/295 |
| 6,678,645 B1 * | 1/2004 | Rajsuman et al. ............. | 703/20 |
| 6,810,442 B1 * | 10/2004 | Lin et al. ......................... | 710/22 |
| 6,865,526 B1 * | 3/2005 | Henkel et al. ................... | 703/18 |
| 7,080,333 B1 * | 7/2006 | Ratchev et al. ............... | 716/104 |
| 7,478,346 B2 * | 1/2009 | Hsu et al. ...................... | 716/104 |
| 7,624,361 B2 * | 11/2009 | Watanabe ..................... | 716/106 |
| 7,802,118 B1 | 9/2010 | Abdalla et al. | |
| 7,882,467 B2 * | 2/2011 | Kuchii ........................... | 716/55 |
| 8,010,920 B2 * | 8/2011 | Bartolotti et al. ............ | 716/106 |
| 8,037,448 B2 * | 10/2011 | Youngman et al. .......... | 716/139 |
| 8,065,641 B2 * | 11/2011 | Gerowitz et al. ............. | 716/104 |
| 8,244,512 B1 * | 8/2012 | Tseng et al. .................... | 703/14 |

(Continued)

OTHER PUBLICATIONS

Srinivas, J.; Jairam, S; "Clock Gating Approaches by IOEX graphs and cluster efficiency plots"; Design, Automation & Test in Europe Conference & Exhibition, 2010.

(Continued)

*Primary Examiner* — Helen Rossoshek

(57) ABSTRACT

A mechanism for generating gate-level activity data for use in clock gating efficiency analysis of an integrated circuit (IC) design is provided. Generating the gate-level activity data includes generating a signal behaviour description for inter-register signals, generating a gate-level netlist for the IC design, generating gate-level stimuli based at least partly on the generated signal behaviour description, and performing gate-level simulation using the generated gate-level stimuli to generate gate-level activity data for the IC design. In one embodiment, generating the signal behaviour description includes performing Register Transfer Level (RTL) simulation of the IC design, and generating the gate-level netlist includes performing RTL synthesis. The RTL simulation and RTL synthesis are performed on RTL data for the IC design.

20 Claims, 2 Drawing Sheets

(56) References Cited

U.S. PATENT DOCUMENTS

| | | | |
|---|---|---|---|
| 8,286,112 B2* | 10/2012 | Miranda et al. | 716/110 |
| 8,402,405 B1* | 3/2013 | Chang et al. | 716/106 |
| 8,560,987 B2* | 10/2013 | Millendorf | 716/106 |
| 2007/0174805 A1* | 7/2007 | Hsu et al. | 716/18 |
| 2008/0010618 A1* | 1/2008 | Watanabe | 716/1 |
| 2009/0031268 A1* | 1/2009 | Miranda et al. | 716/6 |
| 2009/0094569 A1* | 4/2009 | Kuchii | 716/5 |
| 2010/0153893 A1* | 6/2010 | Bartolotti et al. | 716/5 |
| 2011/0035203 A1* | 2/2011 | Dalton et al. | 703/14 |
| 2011/0072412 A1* | 3/2011 | Hasslen et al. | 717/106 |
| 2012/0166168 A1 | 6/2012 | Srinivasan | |
| 2013/0074023 A1* | 3/2013 | Millendorf | 716/112 |
| 2013/0194016 A1* | 8/2013 | Wimer | 327/199 |

OTHER PUBLICATIONS

Srinivas, J., et al., "Clock Gating Effectiveness Metrics: Applications to Power Optimization", IEEE, 10TH International Symposium on Quality Electronic Design, 2009, pp. 482-487.

Sum, Ming-Yi, et al., "ToggleFinder: Accurate RTL Power Estimation for Large Designs", IEEE, Jan. 2005, pp. 16-19.

Sum, Ming-Yi, et al., "Accurate RT-Level Power Estimation Using Up-Down Encoding", IEEE, Circuits and Systems, The 2004 IEEE Asia-Pacific Conference on Circuits and Systems, Dec. 6-9, 2004, pp. 69-72.

* cited by examiner

METHOD AND APPARATUS FOR GENERATING GATE-LEVEL ACTIVITY DATA FOR USE IN CLOCK GATING EFFICIENCY ANALYSIS

FIELD OF THE INVENTION

The field of this invention relates to a method and apparatus for generating gate-level activity data for use in clock gating efficiency analysis.

BACKGROUND OF THE INVENTION

Modern integrated circuit (IC) designs are often required to provide high speed operation whilst also having low power consumption. In order to provide such opposing requirements, it is known to implement techniques such as clock gating in order to reduce the dynamic power dissipation of an IC device.

Clock gating is a well-known technique used in many synchronous circuits, and enables dynamic power dissipation to be reduced by adding additional components to a circuit to 'prune' the clock tree. Such pruning disables the redundant hardware toggling, including, but not limited to, circuit clock tree, hardware registers and other clock dependent devices. When not being switched, the switching power consumption goes to zero, and only leakage currents are incurred.

An important design consideration when implementing a clock gating architecture is the added power requirements of the additional clock gating components, and the impact this can have on the overall power consumption of the IC device. Implementing clock gating on portions of an IC device that would not benefit significantly from clock gating in terms of reduced power consumption may in fact result in the power requirements for the additional clock gating components therefor being greater than the power reductions achieved thereby. Thus, such clock gating may actually increase the power consumption of the IC device. However, an over cautious clock gating implementation will result in sub-optimal power reductions for the IC device, thereby making it more difficult to achieve low power consumption requirements.

In order to maximise the effectiveness of a clock gating architecture, it is necessary to identify those registers of the IC device that would most benefit from clock gating. However, with current electronic design automation (EDA) tools, it is difficult to identify such registers early in the design cycle, and typically impractical to wait until later stages. In particular, for techniques implemented within current synthesis tools, it is difficult to predict the efficiency of a clock gating implementation. Accordingly, it is difficult to achieve an optimally efficient and effective clock gating architecture using current EDA tools.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

A mechanism for generating gate-level activity data for use in clock gating efficiency analysis of an integrated circuit (IC) design is provided. Generating the gate-level activity data includes generating a signal behaviour description for inter-register signals, generating a gate-level netlist for the IC design, generating gate-level stimuli based at least partly on the generated signal behaviour description, and performing gate-level simulation using the generated gate-level stimuli to generate gate-level activity data for the IC design. In one embodiment, generating the signal behaviour description includes performing a Register Transfer Level (RTL) simulation of the IC design, and generating the gate-level netlist includes performing an RTL synthesis. The RTL simulation and RTL synthesis are performed on RTL data for the IC design. Through the use of such RTL techniques registers that would benefit the most from clock gating can be identified early in the design process, thereby improving usage of design resources.

Figure 1:
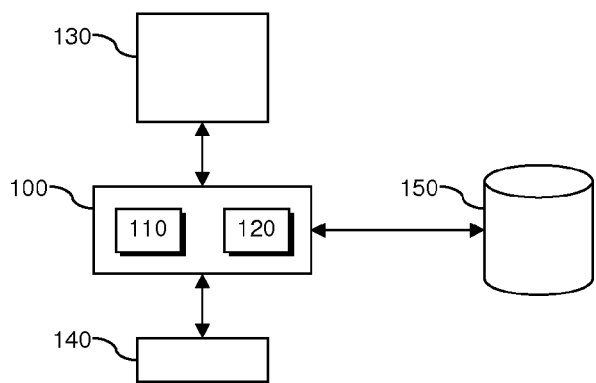
FIG. 1 illustrates a simplified block diagram of an example of an apparatus for performing clock gating efficiency analysis of integrated circuit (IC) designs.

Referring first to FIG. 1, there is illustrated a simplified block diagram of an example of an apparatus 100 for performing clock gating efficiency analysis of integrated circuit (IC) designs. Because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In the illustrated example, the apparatus 100 comprises at least one signal processing module 110 arranged to perform the clock gating efficiency analysis of IC designs. For example, the signal processing module(s) 110 may be arranged to execute computer-readable code stored within one or more non-transitory computer program products, such as illustrated generally at 120, such computer-readable code being operable for performing the method of performing clock gating efficiency analysis of IC designs.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being 'non-transitory' whereas a signal carrier in transit is to be considered 'transitory' notwithstanding that the signal may remain in transit for a lengthy period of time. Accordingly, it is contemplated that such non-transitory computer program products 114 may comprise, by way of example only, at least one of a hard disk, a CD-ROM, an optical storage device, a magnetic storage device, a Read Only Memory, ROM, a Programmable Read Only Memory, PROM, an Erasable Programmable Read Only Memory EPROM, EPROM, an Electrically Erasable Programmable Read Only Memory, EEPROM, and a Flash memory.

In some examples, the apparatus 100 may be operably coupled to one or more user interface components, for example such as a display 130 and a keyboard 140. In this manner, a user is able to interact with computer programs executing on the signal processing module(s) 110 of the apparatus 100.

Figure 2:
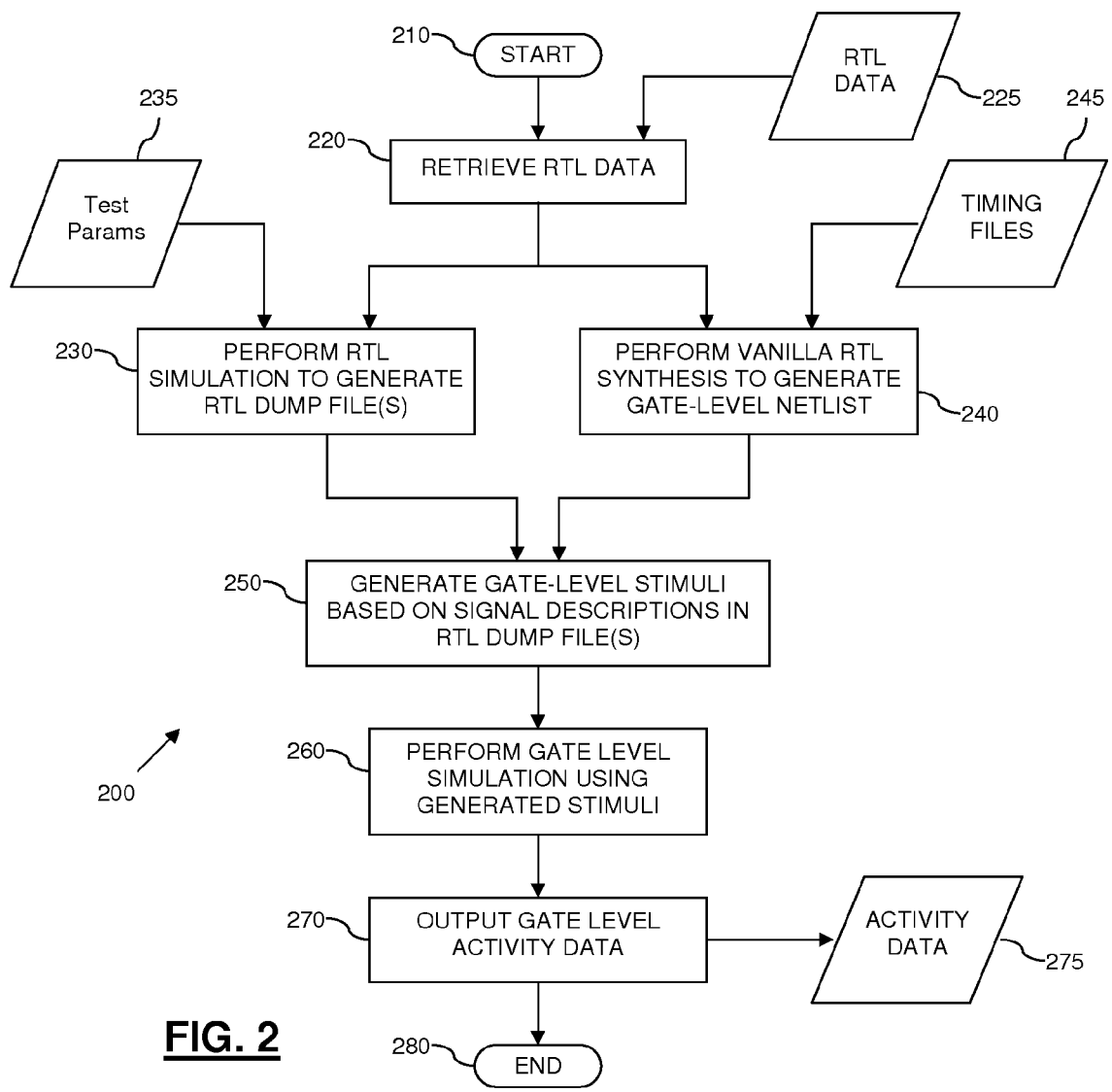
FIGS. 2 and 3 illustrate simplified flowcharts of an example of a method of performing clock gating efficiency analysis of IC designs.
Figure 3:
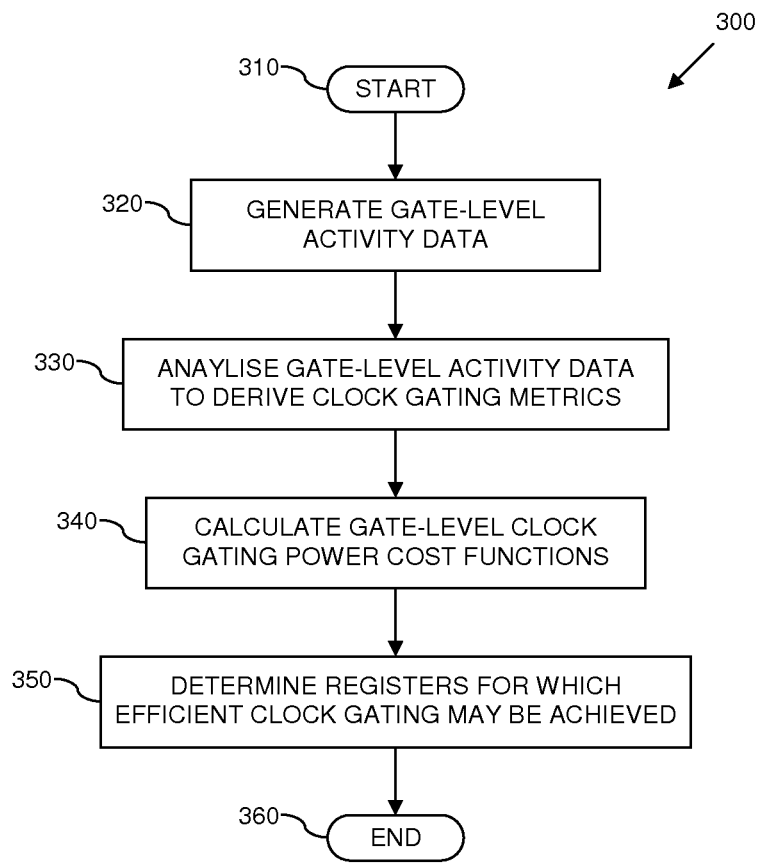

Referring now to FIGS. 2 and 3, there are illustrated simplified flowcharts 200, 300 of an example of a method of performing clock gating efficiency analysis of IC designs, such as may be implemented within the apparatus 100 of FIG. 1.

Referring first to FIG. 2, there is illustrated a simplified flowchart 200 of a method of generating gate-level activity data for use in clock gating efficiency analysis of an IC design. The method starts at 210 and moves on to 220 where, in the illustrated example, RTL (register transfer level) data 225 for the IC data is retrieved, for example from a database such as illustrated at 150 in FIG. 1. As is known to those skilled in the art, RTL is a design abstraction used to model synchronous digital circuits in terms of the flow of digital signals between hardware registers and all other non-synthesizable devices, such as analogue modules, Random Access Memory (RAM) modules, Read Only Memory (ROM) modules or complicated design macros, which are not represented by combinatorial logic models, and the logical operations performed on those digital signals. For clarity, the term 'register' used herein is intended to encompass any sequential logic component, for example as may be implemented by way of one or more flip-flops or equivalent components, other non-synthesizable devices, such as analogue modules, Random Access Memory (RAM) modules, Read Only Memory (ROM) modules and/or complicated design macros, which are not represented by combinatorial logic models.

Next, at 230, RTL simulation is performed to generate a signal behaviour description for inter-register signals, which in the illustrated example is a form of one or more RTL 'dump' files, which captures the RTL design behaviour during the simulation. For clarity, in some examples, simulation may be the use of a computer program to simulate the operation of a digital circuit. For example, performing such RTL simulation may comprise running tests over the RTL data for the IC design, for example based on user defined test parameters 235 provided within the database 150. The description of the behaviour of the inter-register signals may thus be generating in response to the behaviour or the inter-register signals during the running of the RTL data through such tests. In this manner, the description of the behaviour of the inter-register signals may be based on predefined test parameters. Accordingly, by appropriately defining the test parameters, for example to represent one or more expected operating scenarios of the IC design, the description of the behaviour of the inter-register signals may be arranged to comprise a description of the expected behaviour of the inter-register signals.

RTL synthesis is also performed on the RTL data, at 240, to generate a gate-level netlist for the IC design. For clarity, in some examples, logic synthesis may be a process by which an abstract form of desired circuit behaviour, typically in a register transfer level (RTL) form, is turned into a design implementation in terms of logic gates. The outcome of the RTL synthesis in this example is Gate Level (GL) netlist, which describes the logic components of the design and their connections. In the illustrated example, a 'vanilla' RTL synthesis is performed on the RTL data; i.e. using a standard, uncustomised synthesis flow. As is known to those skilled in the art, typically the standard, vanilla RTL synthesis flow provided by an electronic design automation (EDA) tool is required to be significantly modified in order to achieve the required synthesis results for the IC design (e.g. a netlist suitable for achieving a high operating frequency, lower power consumption, small silicon area, etc.). However, by using such a standard, vanilla, RTL synthesis flow (or only a partially modified synthesis flow as compared to a fully modified, backend synthesis flow for the IC design), it is possible to perform such synthesis significantly earlier in the design lifecycle, since it is not necessary to wait for the required modifications to the synthesis flow to be made, whilst still providing a 'compatible' gate-level netlist for the purpose of generating gate-level activity data, as described below. Accordingly, in the illustrated example, the vanilla RTL synthesis only requires, for example, standard liberty timing files 245 provided within the database 150, enabling a simple, 'fast' (i.e. early in the design cycle) synthesis of the RTL data 225.

Figure 4:
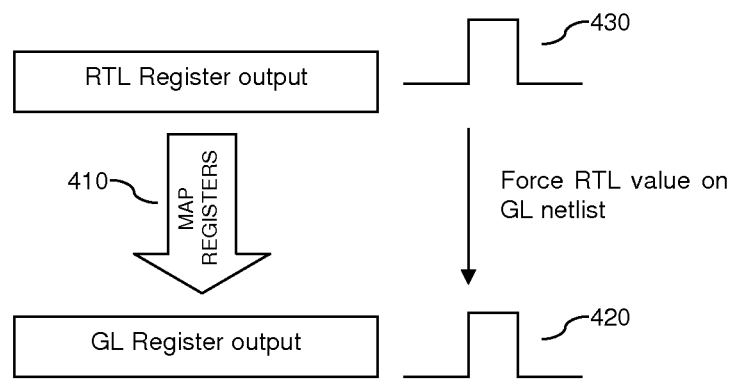
FIG. 4 illustrates a simplified example of generating gate-level stimuli.

Gate-level stimuli are then generated, at 250, based on the signal behaviour description for inter-register signals generated during the RTL simulation at 230. For example, and as illustrated in FIG. 4, the gate-level stimuli may be generate by mapping RTL registers within the signal behaviour description to registers within the gate-level netlist generated during the RTL synthesis, as illustrated generally at 410, and generating a gate-level stimuli 420 for registers within the gate-level netlist based at least partly on waveforms 430 (i.e. state changes over time) for the RTL registers within the signal behaviour description.

Gate-level simulation is then performed, at 260, using the generated gate-level stimuli to generate gate-level activity data 275 for the IC design, which is then output at 270, and the method ends at 280.

In some examples, the gate-level simulation may comprise monitoring, in response to the generated gate-level stimuli, one or more of:
  one or more clock inputs of one or more registers within the IC design;
  one or more data inputs of one or more registers within the IC design; and/or
  one or more data outputs of one or more registers within the IC design.

Thus, the gate-level activity data generated thereby may comprise, for example, one or more of:
  clock input activity for one or more registers within the IC design;
  data input activity for one or more registers within the IC design; and/or
  data output activity for one or more registers within the IC design.

Significantly, as mentioned above by appropriately defining the test parameters used during the RTL simulation at 230, for example to represent one or more expected operating scenarios of the IC design, the description of the behaviour of the inter-register signals used to generate the gate-level stimuli may be arranged to comprise a description of the expected behaviour of the inter-register signals. Accordingly, the gate-level stimuli generated at 250 may be representative of expected stimuli for registers under actual (expected) operating conditions for the IC design. Thus, by using such representative stimuli during the gate-level simulation performed at 260, the resulting gate-level activity data may be representative of actual (expected) operational activity for registers within the IC design.

Furthermore, by performing simulation using the RTL data for the IC design, at 230, to generate the description of the expected behaviour of the inter-register signals, and by performing RTL synthesis using a vanilla synthesis flow (or only a partially modified synthesis flow as compared to a fully modified, backend synthesis flow for the IC design) to generate the gate-level netlist, this gate-level activity data may be generated substantially directly from RTL data, and thus at substantially any/every point within the design cycle for the IC design once RTL data is available. This is in contrast to conventional techniques that are typically restricted to a full backend synthesis flow before 'expected' gate-level simulation is possible. Accordingly, the method of generating gate-level activity data hereinbefore described enables such gate-level activity data to be generated much earlier in the design cycle than convention techniques. As such, and as described in greater detail below, the effectiveness and efficiency of, for example, clock gating circuitry may be analysed earlier in the design cycle, enabling a faster and more cost effective design process.

Referring now to FIG. 3, there is illustrated a simplified flowchart 300 of a method of performing clock gating efficiency analysis of an IC design. The method starts at 310, and moves on to 320 where gate-level activity data is generated, for example such as described above with reference to FIG. 2. Next, at 330, the gate-level activity data is analysed to derive clock gating metrics for registers within the IC design. For example, it is contemplated that such clock gating metrics may comprise one or more of:
  data output/clock activity ratio (Q/CK) for the at least one register within the IC design;
  maximum clock pulses per idle output window (longest idle output window) for the at least one register within the IC design.

For example the, the data output/clock activity ratio (Q/CK) for a register indicates the number of '0 toggles' divided by the number of clock toggles, with a range between 0 and 1. A ratio of 1 is the optimal ratio since there are no unnecessary clock toggles, whilst 0 is the worst case since all clock toggles are unnecessary. For longest idle output window metric, this provides an indication of the longest window for a register in which the clock is toggling, but the register is no sampling any data.

Having derived the required clock gating metrics, the method moves on to 340 where gate-level clock gating power cost functions are calculated. For example, such clock gating power cost functions may be calculated for individual registers based at least partly on one or more of:
  wasted clock toggles for the at least one register within the IC design, for example determined based on one or more of the derived clock gating metrics, such as a data output/clock activity ratio (Q/CK) for the respective register;
  register fan-out size from the respective register within the IC design, for example as defined within the gate-level netlist generated at 240 in FIG. 2;
  added clock skew attributable to gating at least one clock signal within the IC design; and/or
  gated clock leakage attributable to gating at least one clock signal within the IC design.

In some examples, the clock gating power cost function P for a register may be calculated based on Equation 1 below:

$$P=(\text{wasted clock toggles}*\text{register fan-out})/(\text{added clock skew}*\text{gated clock leakage}) \quad [\text{Eq. 1}]$$

Thus, in this manner, a clock gating power cost function may be calculated for individual registers based on the potential effectiveness of clock gating in relation to the respective register (e.g. as defined by wasted clock toggles and register fan-out therefor) as well as on the potential cost implication of implementing clock gating in relation to the respective register (e.g. as defined by added clock skew and gated clock leakage therefor).

It is then determined whether efficient clock gating may be achieved for one or more registers within the IC design based at least partly on the calculated clock gating power cost functions, at 350. For example, registers for which efficient clock gating may be achieved may be identified based on their respective clock gating power cost functions; e.g. those registers comprising a clock gating power cost function greater than a predefined threshold value may be determined as being suitable for efficient clock gating.

The method then ends at 360.

As identified above in relation to FIG. 2, the method of generating gate-level activity data hereinbefore described enables such gate-level activity data to be generated much earlier in the design cycle than convention techniques. As such, by using such gate-level activity data to derive clock gating metrics, and to calculate gate-level power cost functions based on those clock gating metrics as described above in relation to FIG. 3, individual registers for which effective and efficient clock gating is possible may be identified much earlier in the design cycle than for conventional techniques, enabling a faster and more cost effective design process.

At least parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention may be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
   generating a signal behaviour description for inter-register signals by performing Register Transfer Level (RTL) simulation of an IC design;
   generating a gate-level netlist for the IC design by performing an RTL synthesis;
   generating gate-level stimuli using the signal behaviour description;
   generating gate-level activity data for the gate-level netlist of IC design by gate level simulation using the generated gate level stimuli;
   deriving at least one clock gating metric for at least one register within the IC design based on gate-level activity data therefor;
   calculating, at a data processor, at least one clock gating power cost function for the at least one register within the IC design based on the clock gating metric; and
   determining, at the data processor, whether efficient clock gating may be achieved for the at least one register within the IC design based on the clock gating power cost function(s) therefor.

2. The method of claim 1, wherein said generating the signal behaviour description for inter-register signals comprises performing an Register Transfer Level (RTL) simulation on RTL data for the IC design.

3. The method of claim 2 wherein said performing RTL simulation comprises using user-defined test parameters.

4. The method of claim 3, wherein the method comprises performing RTL synthesis on RTL data for the IC design to generate the gate-level netlist.

5. The method of claim 3, wherein generating gate-level stimuli comprises mapping RTL registers within the signal behaviour description to registers within the gate-level netlist, and generating a gate-level stimuli for registers within the gate-level netlist based at least partly on waveforms for the RTL registers within the signal behaviour description.

6. The method of claim 2, wherein generating gate-level stimuli comprises mapping RTL registers within the signal behaviour description to registers within the gate-level netlist, and generating a gate-level stimuli for registers within the gate-level netlist based at least partly on waveforms for the RTL registers within the signal behaviour description.

7. The method of claim 2, wherein performing gate-level simulation comprises monitoring, in response to the generated gate-level stimuli, at least one from a group comprising at least one of:
   at least one clock input of at least one register within the IC design;
   at least one data input of at least one register within the IC design; and
   at least one data output of at least one register within the IC design.

8. The method of claim 2, wherein the gate-level activity data comprises at least one from a group comprising at least one of:
   clock input activity for at least one register within the IC design;
   data input activity for at least one register within the IC design; and data output activity for at least one register within the IC design.

9. The method of claim 1, wherein said generating the gate-level netlist for the IC design comprises performing the RTL synthesis on RTL data for the IC design.

10. The method of claim 9, wherein the RTL synthesis comprises a standard, un-customized synthesis flow.

11. The method of claim 1, wherein said generating the gate-level stimuli further comprises:
mapping RTL registers within the signal behaviour description to registers within the gate-level netlist; and
generating a gate-level stimuli for registers within the gate-level netlist based on waveforms for the RTL registers within the signal behaviour description.

12. The method of claim 1, wherein said performing gate-level simulation comprises:
monitoring, in response to the generated gate-level stimuli, at least one from a group comprising at least one of:
at least one clock input of at least one register within the IC design,
at least one data input of at least one register within the IC design, and
at least one data output of at least one register within the IC design.

13. The method of claim 1, wherein the gate-level activity data comprises at least one from a group comprising at least one of:
clock input activity for at least one register within the IC design,
data input activity for at least one register within the IC design, and
data output activity for at least one register within the IC design.

14. The method of claim 1, wherein the at least one clock gating metric comprises at least one from a group comprising data output/clock activity ratio for the at least one register within the IC design; and
maximum clock pulses per idle output window for the at least one register within the IC design.

15. The method of claim 1, wherein the method further comprises performing said calculating clock gating power cost functions based at least partly on at least one from a group comprising at least one of:
wasted clock toggles for the at least one register within the IC design, determined based at least partly on the at least one clock gating metric;
register fan-out size from the at least one register within the IC design;
added clock skew attributable to gating at least one clock signal within the IC design; and
gated clock leakage attributable to gating at least one clock signal within the IC design.

16. The method of claim 1 further comprising:
performing efficiency analysis of an integrated circuit design based upon the gate-level activity data.

17. A non-transitory computer-readable storage medium storing instructions configured to be executed by a signal processing module to generate gate-level activity data for use in clock gating efficiency analysis of an integrated circuit (IC) design, the instructions configured to:
generate a signal behaviour description for inter-register signals;
generate a gate-level netlist for the IC design using Register Transfer Level (RTL) synthesis;
generate gate-level stimuli based at least partly on the generated signal behaviour description;
generate gate-level activity data for the IC design by performing gate level simulation using the generated gate level stimuli;
derive at least one clock gating metric for at least one register within the IC design based on gate-level activity data therefor:
calculate at least one clock gating power cost function for the at least one register within the IC design based on the clock gating metric; and
perform a clock sating efficiency analysis based upon the gating power cost function(s).

18. The non-transitory computer-readable storage medium of claim 17 wherein the instructions configured to generate the signal behaviour description for inter-register signal further comprise instructions configured to generate the signal behaviour description using RTL simulation on RTL data for the IC design.

19. The non-transitory computer-readable storage medium of claim 18 wherein the instructions configured to generate the gate-level netlist for the IC design further comprise instructions configured to perform RTL synthesis on RTL data for the IC design to generate the gate-level netlist.

20. A method comprising:
generating a signal behaviour description for inter-register signals by performing Register Transfer Level (RTL) simulation of the IC design using user defined test patterns;
generating, substantially directly from RTL data of the IC design, a frontend gate-level netlist for the IC design by performing an RTL synthesis that does not include back-end synthesis modifications to the IC design;
mapping RTL registers within the signal behaviour description to gate-level registers within the gate-level netlist;
generating, based on waveforms for the RTL registers within the signal behaviour description, gate-level stimuli for gate-level registers using the signal behaviour description;
generating gate-level activity data for the gate-level netlist of IC design by gate level simulation using the generated gate level stimuli, wherein the gate level simulation comprises monitoring, in response to the generated gate-level stimuli, at least one of a clock input of a first register of the gate-level registers, a data input activity of the first register, and a data output activity of the first register;
deriving, at a data processor, at least one clock gating metric for the first register based on the gate-level activity data;
calculating, at a data processor, at least one clock gating power cost function for the first register; and
modifying, at a data processor, the IC design to clock gate the first register in response to determining, based on the power cost function, that the first register can be efficiently clock gated;
producing an integrated circuit based on the modified IC design.

* * * * *